United States Patent
Excoffier et al.

(10) Patent No.: US 9,298,501 B2
(45) Date of Patent: Mar. 29, 2016

(54) CONCURRENT MANAGEMENT CONSOLE OPERATIONS

(75) Inventors: Franck Excoffier, Tucson, AZ (US); Michael P. Groover, Vail, AZ (US); Robin Han, Lincoln, CA (US); Mario Kiessling, Oregon City, OR (US); Yang Liu, Shanghai (CN); Diana Y. Ong, San Jose, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 464 days.

(21) Appl. No.: 13/111,451

(22) Filed: May 19, 2011

(65) Prior Publication Data

US 2012/0297234 A1 Nov. 22, 2012

(51) Int. Cl.
*G06F 9/48* (2006.01)
*H04L 12/24* (2006.01)

(52) U.S. Cl.
CPC .............. *G06F 9/485* (2013.01); *H04L 41/082* (2013.01); *H04L 41/0843* (2013.01); *H04L 41/0886* (2013.01)

(58) Field of Classification Search
CPC ... G06F 11/0712; G06F 11/0793; G06F 8/60; G06F 8/65; G06F 9/485; G06F 8/61; G06F 8/63; G06F 9/4416; G06F 9/4881; H04L 41/082; H04L 41/0886; H04L 41/0843; H04L 67/34; H04L 41/08; H04L 41/0889; H04L 61/2015
USPC ......... 709/220, 217, 218, 219, 221, 223, 224; 717/168, 172, 174, 177, 127; 714/2, 15
See application file for complete search history.

(56) References Cited

U.S. PATENT DOCUMENTS

| | | | |
|---|---|---|---|
| 6,609,215 B1 * | 8/2003 | Hamilton et al. | 714/15 |
| 7,089,259 B1 * | 8/2006 | Kouznetsov et al. | |
| 7,093,283 B1 * | 8/2006 | Chen et al. | 726/6 |
| 7,346,672 B2 * | 3/2008 | Harvey, IV | 709/221 |
| 7,844,718 B2 * | 11/2010 | Polcha et al. | 709/229 |
| 7,865,689 B2 | 1/2011 | Sater et al. | |
| 7,877,590 B2 | 1/2011 | Van Patten Benhase et al. | |
| 7,937,438 B1 * | 5/2011 | Miller et al. | 709/203 |
| 8,245,222 B2 * | 8/2012 | Chalupa et al. | 717/174 |
| 8,775,577 B1 * | 7/2014 | Alford et al. | 709/221 |
| 2002/0165945 A1 * | 11/2002 | Buswell | H04L 41/0213 709/221 |
| 2002/0178207 A1 * | 11/2002 | McNeil | 709/102 |
| 2003/0177208 A1 * | 9/2003 | Harvey, IV | 709/221 |
| 2003/0233363 A1 * | 12/2003 | Cohen et al. | 707/100 |
| 2004/0103176 A1 * | 5/2004 | Schmid | 709/222 |
| 2004/0268340 A1 * | 12/2004 | Steeb et al. | 717/174 |
| 2006/0130046 A1 * | 6/2006 | O'Neill | 717/168 |
| 2006/0259756 A1 * | 11/2006 | Thompson et al. | 713/2 |
| 2007/0016589 A1 * | 1/2007 | Hara et al. | 707/10 |
| 2007/0157196 A1 * | 7/2007 | Goicea et al. | 717/174 |
| 2007/0266128 A1 * | 11/2007 | Bhogal et al. | 709/223 |
| 2009/0019108 A1 * | 1/2009 | Ashok et al. | 709/203 |

(Continued)

*Primary Examiner* — Gary Mui
*Assistant Examiner* — Michael Phillips
(74) *Attorney, Agent, or Firm* — Anthony Canale; Hoffman Warnick LLC

(57) ABSTRACT

A setup module organizes a single software image for a management command. A process module creates a plurality of processes independently executing the management command on each of the plurality of devices from a management console. Each process employs the software image. A termination module ends the management command after each process has completed on each of the plurality of devices.

20 Claims, 5 Drawing Sheets

(56) References Cited

U.S. PATENT DOCUMENTS

| | | | |
|---|---|---|---|
| 2010/0131648 A1* | 5/2010 | Dehaan | 709/226 |
| 2010/0186063 A1* | 7/2010 | Oba et al. | 726/1 |
| 2010/0223608 A1* | 9/2010 | Dehaan et al. | 717/176 |
| 2011/0035618 A1* | 2/2011 | Jann et al. | 714/3 |
| 2012/0084399 A1* | 4/2012 | Scharber et al. | 709/219 |
| 2013/0145356 A1* | 6/2013 | Ranjan | G06F 21/57 717/170 |
| 2013/0151646 A1* | 6/2013 | Chidambaram et al. | 709/213 |
| 2013/0247033 A1* | 9/2013 | Sawhney et al. | 718/1 |
| 2015/0333962 A1* | 11/2015 | Tukol | G06F 9/44505 709/221 |

* cited by examiner

CONCURRENT MANAGEMENT CONSOLE OPERATIONS

FIELD

The subject matter disclosed herein relates to management console operations and more particularly relates to concurrent management console operations.

BACKGROUND

Description of the Related Art

A management console supports the management of multiple subsystems and/or devices. For example, the management console may support the creation, configuration, and management of multiple storage subsystems, each with multiple devices.

Managing the subsystem and/or a device from the management console may require significant time to prepare for a management operation, execute the management operation, and conclude the management operation. The time required to perform the management operation increases greatly when multiple subsystems and/or devices must be managed.

BRIEF SUMMARY

From the foregoing discussion, it should be apparent that a need exists for a method and apparatus that concurrently performs management console operations. Beneficially, such a method and apparatus would support the concurrent performance of the management operation on multiple devices and/or subsystems.

The present invention has been developed in response to the present state of the art, and in particular, in response to the problems and needs in the art that have not yet been fully solved by currently available management console operation methods. Accordingly, the present invention has been developed to provide a method and apparatus for concurrent management console operations that overcome many or all of the above-discussed shortcomings in the art.

A method is presented for concurrent management console operations. The method organizes a single software image for a management command. The method further creates a plurality of processes independently executing the management command on each of a plurality of devices from a management console. Each process employs the software image. In addition, the method ends the management command after each process has completed on each of the plurality of devices.

The apparatus for concurrent management console operations is provided with a plurality of modules configured to functionally execute the method. These modules in the described embodiments include computer readable storage medium, a setup module, a process module, and a termination module.

The computer readable storage medium stores computer readable program code executable by a processor. The setup module organizes a single software image for a management command. The process module creates a plurality of processes independently executing the management command on each of the plurality of devices from a management console. Each process employs the software image. The termination module ends the management command after each process has completed on each of the plurality of devices.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
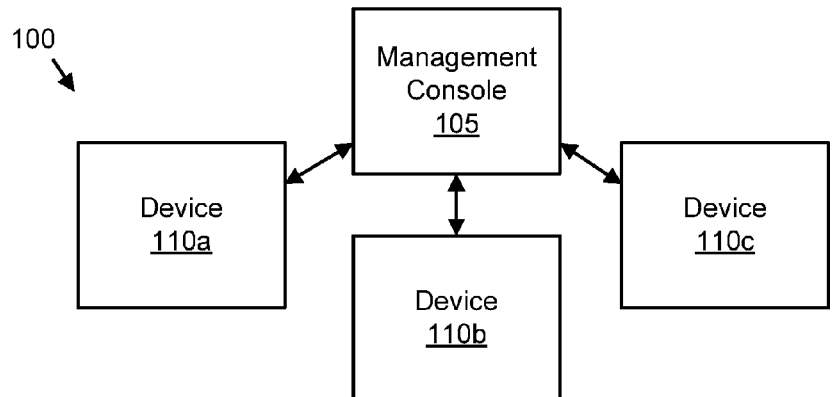
FIG. 1 is a schematic block diagram illustrating one embodiment of a data processing system.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a data processing system (DPS) 100. The DPS 100 includes a management console 105 and a plurality of devices 110. Each device 110 may be a subsystem, a discreet device, a component, and combinations thereof. The management console 105 may be used to manage the devices 110. For example, the management console 105 may be used to create a logical partition, create a virtual machine, migrate a system, install software, update software, or the like on the devices 110.

Figure 2:
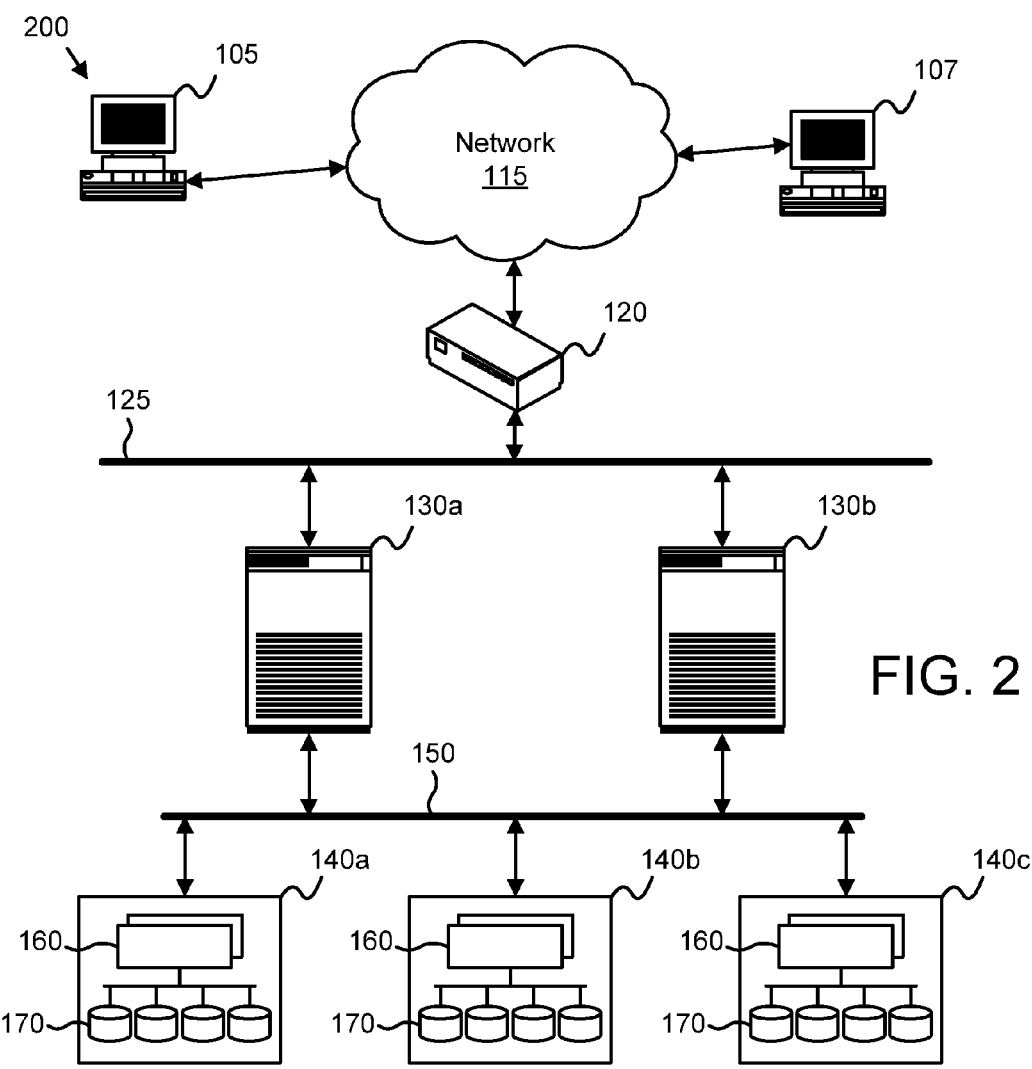
FIG. 2 is a schematic block diagram illustrating one alternate embodiment of a data processing system.

FIG. 2 is a schematic block diagram illustrating one alternate embodiment of a DPS 200. The DPS 200 includes the management console 105, a client 107, a network 115, a router 120, an internal network 125, one or more servers 130, a storage communications channel 150, and one or more storage subsystems 140.

The servers 130 may also be configured as mainframe computers, blade centers comprising multiple blade servers, and the like. Although for simplicity one network 115, one router 120, one internal network 125, two servers 130, one storage communications channel 150, and three storage subsystems 140 are shown, any number of clients 110, networks 115, routers 120, internal networks 125, servers 130, storage communications channels 150 and storage subsystems 140 may be employed. One of skill in the art will also readily recognize that the DPS 200 could include other data processing devices such as bridges, scanners, printers, and the like.

Each storage subsystem 140 includes one or more storage controllers 160 and one or more storage devices 170. The storage devices 170 may be hard disk drives, optical storage devices, magnetic tape drives, micromechanical storage devices, holographic storage devices, and semiconductor storage devices. Alternatively, the storage device 170 may also be configured as a just a bunch of disks (JBOD), a redundant array of independent disks (RAID), a tape library, a tape backup, a tape library, a compact disk read only memory (CD ROM) library, and the like.

In one embodiment, the DPS 200 provides data storage and data manipulation services for a client 107. For example, the client 107 may access data stored on a storage device 170 of a storage subsystem 140 by communicating a request through the network 115, the router 120, the internal network 125, a server 130, and the storage communications channel 150 to a storage controller 160 for the storage device 170. The storage controller 160 may retrieve the data from the storage device 170 and communicate the data to the client 110.

The network 115 connecting the client 107 and the servers 130 may be selected from a local area network (LAN), a wide area network (WAN), the Internet, an Ethernet network, a token ring network, or the like. The network 115 may comprise one or more nodes that may provide one or more physical and/or logical paths for transferring the data. The internal network 125 and the storage communications channel 150 may be for example a LAN, a WAN, or the like.

Figure 3:
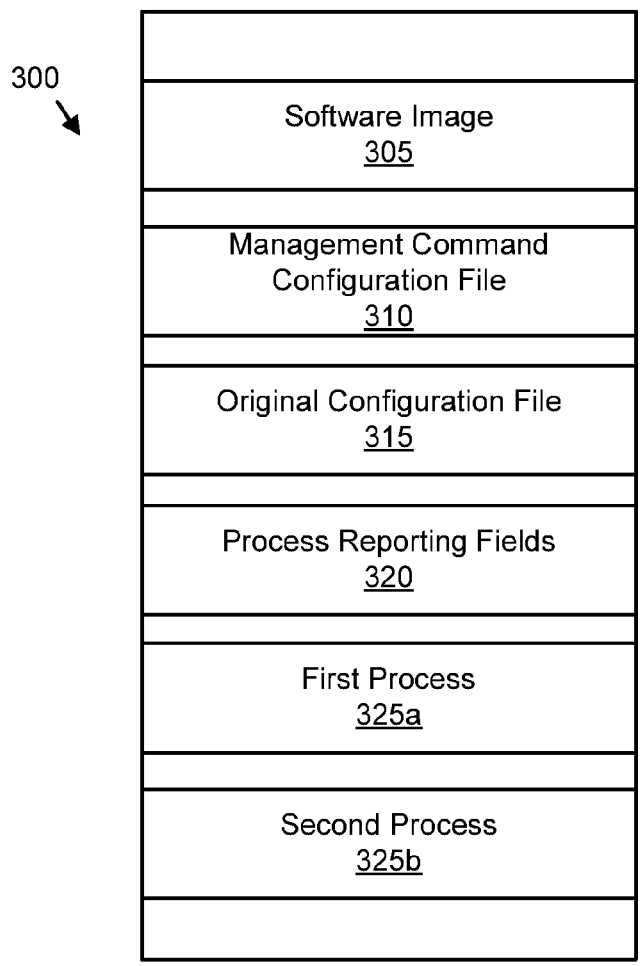
FIG. 3 is a schematic block diagram illustrating one embodiment of a memory space.

FIG. 3 is a schematic block diagram illustrating one embodiment of a memory space 300. The memory space 300 represents addresses in a storage device such as a semiconductor memory, a hard disk drive, or the like. The memory space 300 may be embodied in the management console 105 of FIGS. 1-2. Alternatively, the memory space 300 may be accessed remotely by the management console 105. The description of the memory space 300 refers to elements of FIGS. 1-3, like numbers referring to like elements.

In the depicted embodiment, the memory space 300 stores a software image 305, a management command configuration file 310, an original configuration file 315, process recording fields 320, and one or more processes 325. The software image 305, management command configuration file 310, original configuration file 315, and process recording fields 320 may be organized as one or more data structures. Each process 325 may be organized as computer readable program code.

The management command configuration file 310 and the original configuration file 315 may be Dynamic Host Configuration Protocol (DHCP) configuration files. Alternatively, the management command configuration file 310 and the original configuration file 315 are Network Installation Management (NIM) configuration files.

Each process 325 may perform a management command on a single device 110. In one embodiment, each process 325 may execute independently and concurrently on one of the plurality of devices 110.

In one embodiment, the process recording fields 320 are written to by the processes 325 to communicate with the management console 105 as will be described hereafter. For example, a first process 325a may write a completion status to the process recording fields 320.

Figure 4:
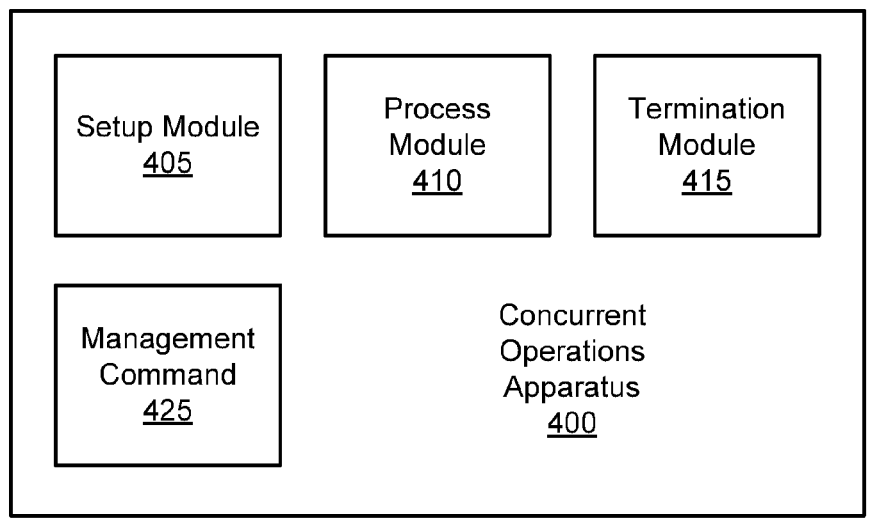
FIG. 4 is a schematic block diagram illustrating one embodiment of a concurrent operations apparatus.

FIG. 4 is a schematic block diagram illustrating one embodiment of a concurrent operations apparatus 400. The apparatus 400 may be embodied in the management console 105 of FIGS. 1-2. The description of the apparatus refers to elements of FIGS. 1-3, like numbers referring to like elements. The apparatus 400 includes a setup module 405, a process module 410, and termination module 415. In one embodiment, the apparatus 400 also includes the management command 425. The setup module 405, process module 410, termination module 415, and management command 425 may be embodied in computer readable program code stored on a computer readable storage medium and executed by a processor.

The setup module 405 organizes the software image 305 for the management command 425. The process module 410 creates a plurality of processes 325 independently executing the management command 425 on each of the plurality of devices 110 from the management console 105. Each process 325 employs the software image 305. In one embodiment, each process 325 may only employ the single software image 305. The termination module 415 ends the management command 425 after each process has completed on each of the plurality of devices.

The management command 425 may be selected from the group consisting of a logical partition creation command, a virtual machine creation command, a system migration command, a software installation command, and a software upgrade command. Alternatively, the management command 425 may comprise combinations of the logical partition creation command, the virtual machine creation command, the system migration command, the software installation command, and the software upgrade command.

Figure 5:
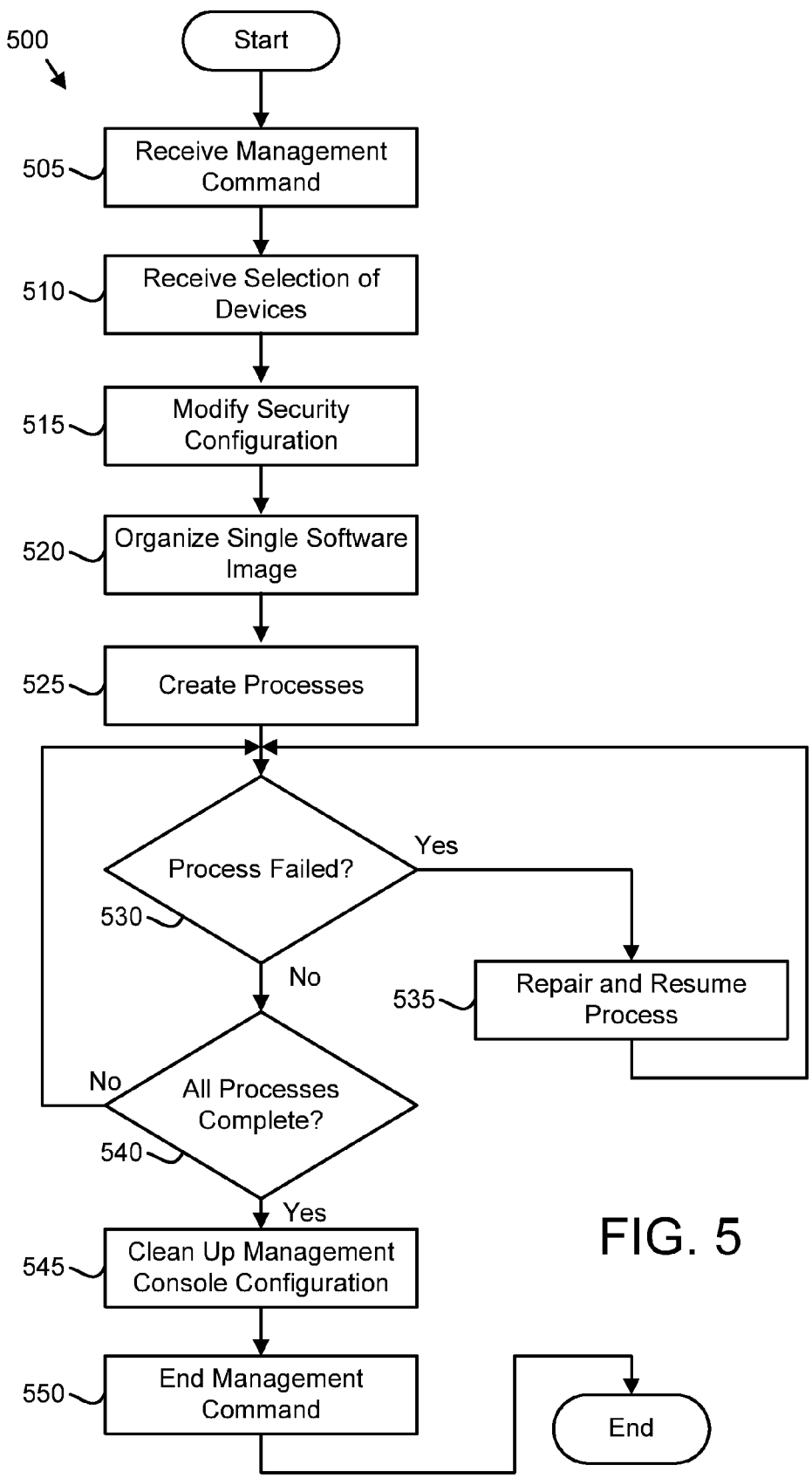
FIG. 5 is a schematic flow chart diagram illustrating one embodiment of a concurrent management operations method.

FIG. 5 is a schematic flow chart diagram illustrating one embodiment of a concurrent management operations method 500. The method 500 may perform the functions of the apparatus 400 of FIG. 4. The description of the method 500 may refer to elements of FIGS. 1-4, like numbers referring to like elements. In one embodiment, the method 500 is performed by computer readable program code stored on a computer readable storage medium and executed by a processor.

The method 500 starts, and in one embodiment, the setup module 405 receives 505 the management command 425. The management command 425 may be received 505 at the management console 105. In addition, the management command 425 may be generated automatically in response to an event such as the installation of a device 110, an error message, a maintenance notification, and the like. Alternatively, a user may enter the management command 425.

The setup module 405 may further receive 510 a selection of the plurality of devices 110. In one embodiment, the selection of the plurality of devices 110 is received at the management console 105. The selection of the plurality of devices 110 may be through a Graphical User Interface (GUI). Alternatively, the selection of the plurality of devices 100 and may be generated automatically in response to an event such as the installation of the devices 110, an error message, a maintenance notification, and the like. For example, each device 110 that is installed on the DPS 100 but not configured may be selected.

The setup module 405 may modify 515 a security configuration of the management console 105 to receive communications from the plurality of devices 110. In one embodiment, the setup module 405 sets a port mask to permit writes to a file system of the management console 105 from the plurality of processes 325. The setup module 405 may set the port mask to permit writes to the process recording fields 320 for the plurality of processes 325.

In one embodiment, the setup module 405 modifies 515 the security configuration by creating the management command configuration file 310 for the management command 425. In one embodiment, the setup module 405 stops the use of the original configuration file 315, creates the management command configuration file 310, and directs all configuration files accesses to the management command configuration file 310.

The setup module 405 may organize 520 a single software image 305 for the management command 425. In one embodiment, the software image 305 comprises data that is copied to the plurality of devices 110. In addition, the software image 305 may comprise parameters for each of the devices 110. The parameters may specify how the management command 425 is performed on each of the devices 110. For example, the parameters may include a logical unit size for each device 110.

By organizing 520 a single software image 305 for each device 110, the setup module 405 reduces the time required to prepare for executing the management command 425 as the single software image 305 is organized 520 only once. In one embodiment, the single software image 305 is retained for use by a subsequent management command 425.

The process module 410 creates 525 the plurality of processes 325 independently executing the management command 425 are device 110 from the management console 105. Each process 325 may be created as a thread. Each thread may be configured using the parameters of the software image 305. In one embodiment, each process 325 employs the software image 305. In a certain embodiment, each process 325 performs the management command 425 on one device 110. Alternatively, each process 325 may perform the management command 425 on one or more devices 110.

For example, the process module 410 may create 525 a first process 325a that performs the management command 425 on a first device 110a. In addition, the process module 410 may create 525 a second process 325b that concurrently and independently performs the management command on a second device 110b.

In one embodiment, the process module 410 determines 530 if the first process 325a of the plurality of processes 325 is failed. The first process 325a may write a status message to the process recording fields 320 to indicate that the first process 325a is failed. Alternatively, the process module 410 may initiate a process timer for each process 325. The process timer may measure elapsed time that the process 325 has executed. If the first process 325a does not report that the first process 325a is complete by writing a status message to the process recording fields 320 that indicates that the first process 325a completed successfully before the process timer for the first process 325a exceeds a timer threshold, the process module 410 may determine 530 that the first process 325a is failed.

If the process module 410 determines 530 that the first process 325a is failed, the process module 410 may repair and resume 535 the first process 325a. In one embodiment, the process module 410 identifies a cause of the first process 325a failure. The process module 410 may further mitigate the cause of the first process 325a failure and resume the first process 325a.

Alternatively, the process module 410 may repair and resume 535 the first process 325a by stopping execution of the first process 325a and creating a new first process 325a to execute the management command 425. The process module 410 may further loop to determine 530 if the first process 325a of the plurality of processes 325 is failed.

If the process module 410 determines 530 that the first process 325a is not failed, the process module 410 determines 540 if all processes 325 are complete. The process module 410 may pass the first process 325a for a first device 110a if the first process 325a successfully completes on the first device 110a. In one embodiment, the first process 325a may write a status message to the process recording fields 320 indicating that the first process 325 is successfully completed.

In addition, the process module 410 may fail the first process 325a for the first device 110a if the first process 325a does not successfully complete on the first device 110a. The first process 325a may write a status message to the process recording fields 320 to indicate that the first process 325a is failed. Alternatively, the process module 410 may fail the first process 325a if the first process 325a does not report that the first process 325a is complete by writing a status message to the process recording fields 320 that indicates that the first process 325a completed successfully before the process timer for the first process 325a exceeds the timer threshold. If all processes 325 are not complete, the process module 410 loops to determine 530 if another process 325 of the plurality of processes 325 is failed.

If the process module 410 determines 540 that all processes 325 are complete, termination module 415 may clean up 545 the management console configuration. In one embodiment, the process module 410 cleans up 545 the management console configuration by replacing the management command configuration file 310 with the original configuration file 315.

The termination module 415 may further end 550 the management command 425 and the method 500 ends. In one embodiment, the termination module 415 reports that the management command 425 is complete. In addition, termination module 415 may update a status for each of the plurality of devices 110.

Figure 6:
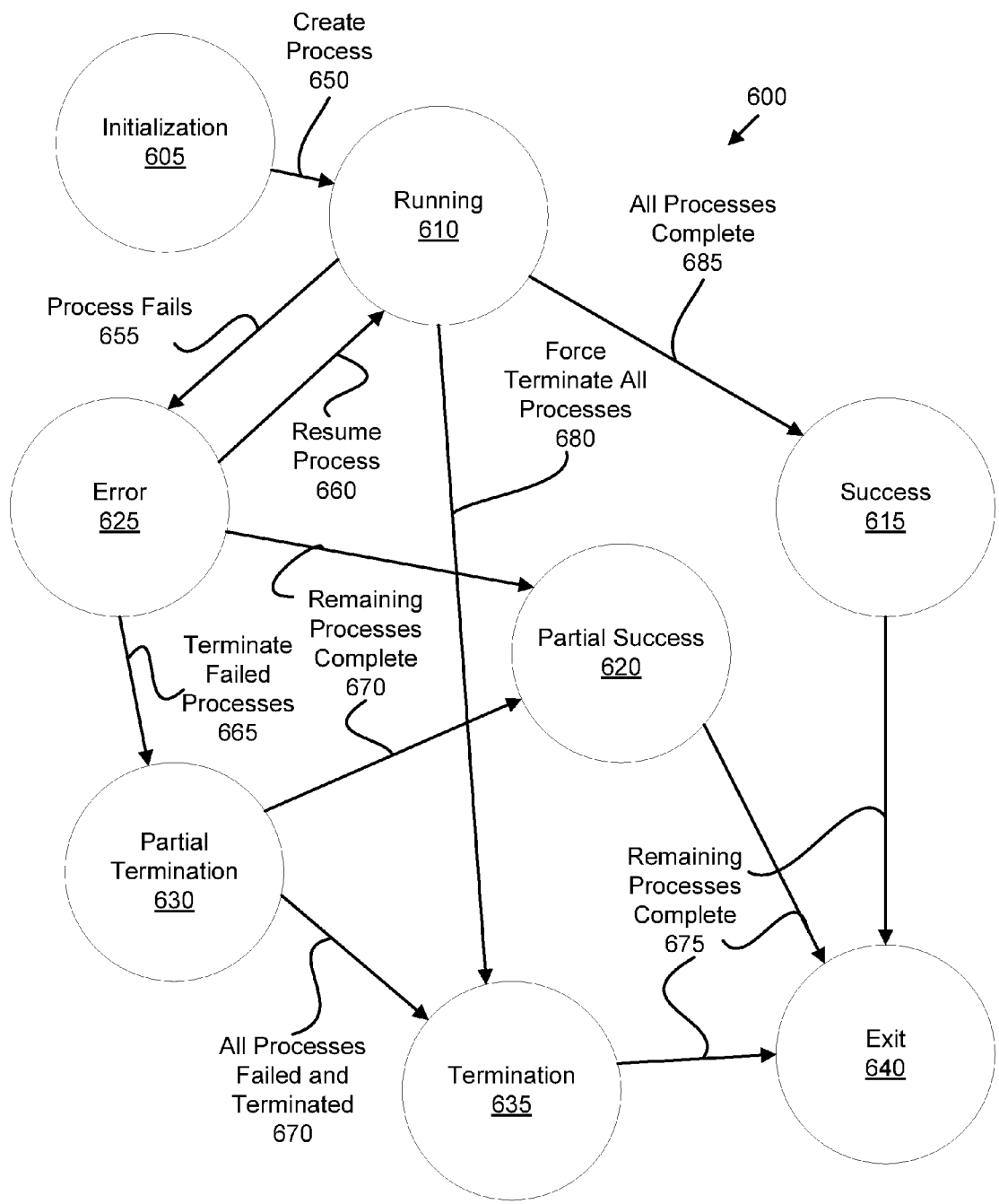
FIG. 6 is a schematic diagram illustrating one embodiment of a concurrent management operations state machine.

FIG. 6 is a schematic diagram illustrating one embodiment of a concurrent management operations state machine 600. The state machine 600 may be embodied in the management console 105. In one embodiment, the state machine 600 is embodied in the apparatus 400. The state machine 600 may perform the functions of the apparatus 400 and the method 500 of FIGS. 4-5. The description of the state machine 600 refers to elements of FIGS. 1-5, like numbers referring to like elements.

The state machine 600 may start with an initialization state 605. During the initialization state 605, the setup module 405 may receive 505 the management command 425, receive 510 the selection of the plurality of devices 110, modify 515 the security configuration of the management console 110 to receive communications from the plurality of devices 110, and organize 520 a single software image 305.

The state machine 600 further creates the processes 650 and transitions to a running state 610. The process module 410 may create 525 the plurality of processes 325 to transition to the running state 610. If a process 325 fails 655, the process module 410 may determine 530 that the process 325 is failed and transition to an error state 625. If the process module 410 repairs and resumes 535 the process 325 from the error state 625, the state machine 600 resumes the process 660 and transitions to the running state 610.

If the process module 410 terminates one or more failed processes 665 from the error state 625, the state machine 600 transitions to a partial termination state 630. If the process module 410 fails and terminates all processes 670, the state machine 600 transitions from the partial termination state 630 to the termination state 635. In addition, if the process module 410 forces the termination of all processes 680, the state machine 600 transitions from the running state 610 to the termination state 635. The process module 410 may further complete the remaining processes 675 and transition from the termination state 635 to the exit state 640.

If the process module is 410 completes all processes 685, the state machine 600 transitions from the running state 610 to the success state 615. The process module 410 may determine 540 that all processes are complete, completing the remaining processes 675, and the state machine transitions to the success state 615 to the exit state 640.

The process module 410 may complete the remaining processes 670 from the error state 625 and/or the partial termination state 630 and transition the state machine 600 to the partial success state 620. The process module 410 may further allow the remaining processes 325 to complete 675, determine 545 that the remaining processes 325 are complete, and transition to the exits state 640.

In the exit state 640, the termination module 415 may clean up 545 the management console configuration. In addition, the termination module 415 may end 550 the management command 425.

The state machine 600 may assure that each process 325 is either completed or terminated before cleaning up 545 the management console configuration. Thus the state machine 600 may be used to monitor and manage the plurality of processes 325 that each execute the management command 425.

Figure 7:
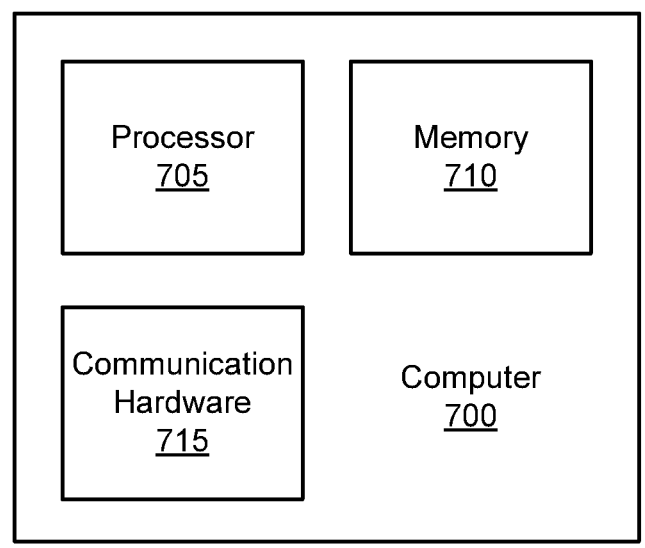
FIG. 7 is a schematic block diagram illustrating one embodiment of a computer.

FIG. 7 is a schematic block diagram illustrating one embodiment of a computer 700. In one embodiment, the computer 700 embodies the management console 105 of FIGS. 1-2. In addition, the computer 700 may embody the memory space 300 and the apparatus 400 of FIGS. 3-4. The computer 700 may further perform the method 500 and the state machine 600 of FIGS. 5-6. The description of the computer 700 refers to elements of FIGS. 1-6, like numbers referring to like elements. The computer 700 includes a processor 705, a memory 710, and communication hardware 715.

The memory 710 may store computer readable program code. The memory 710 may be the computer readable storage medium. In one embodiment, the memory 710 includes the memory space 300. The processor 705 may execute the computer readable program code. In addition, the computer 700 may communicate with the devices 710 through the communication hardware 715.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for concurrent management console operations comprising:
    organizing, by use of a processor, a single software image for a management command, the single software image comprising parameters that specify a logical unit size for each device of a plurality of devices;
    creating a plurality of processes independently executing the management command and employing the single software image on each of the plurality of devices from a management console, wherein the management console comprises a process recording field;
    creating a management command Dynamic Host Configuration Protocol (DHCP) configuration file for the management command;
    directing DHCP configuration file accesses to the management command DHCP configuration file;
    stopping use of an original DHCP configuration file;
    failing a first process of the plurality of processes on a first device of the plurality of devices in response to the first process writing a status message indicating that the first process is failed to the process recording field;
    repairing and resuming the first process in response to failing the first process;
    determining that each process of the plurality of processes has completed on each of the plurality of devices in response to each process writing a status message indicating that the process is complete to the process recording field;
    ending the management command after each process has completed; and
    replacing the management command DHCP configuration file with the original DHCP configuration file.

2. The method of claim 1, wherein each process independently and concurrently executes on each device of the plurality of devices in response to the parameters for the device.

3. The method of claim 1, the method further comprising modifying a security configuration of the management console to receive communications from the plurality of devices.

4. The method of claim 3, wherein modifying the security configuration comprises setting a port mask to permit writes to a file system of the management console from the plurality of processes.

5. The method of claim 1, wherein the method further comprises:
    receiving the management command; and
    receiving a selection of the plurality of devices.

6. The method of claim 1, the method further comprising passing a first process for a first device if the first process successfully completes on the first device else failing the first process for the first device if the first process does not successfully complete on the first device.

7. The method of claim 1 the method further comprising cleaning up a management console configuration.

8. The method of claim 7 wherein cleaning up the management console configuration comprises replacing the management command DHCP configuration file with the original DHCP configuration file.

9. The method of claim 1, wherein the management command configuration file and the original configuration file are Network Installation Management (NIM) configuration files.

10. The method of claim 1, wherein the management command is selected from the group consisting of a logical partition creation command, a virtual machine creation command, a system migration command, a software installation command, and a software upgrade command.

11. The method of claim 1, wherein the single software image is organized once for the plurality of devices.

12. An apparatus comprising:
    a non-transitory computer readable storage medium storing computer readable program code executable by a processor, the computer readable program code comprising:
    a setup module organizing a single software image for a management command, the single software image comprising parameters that specify a logical unit size for each device of a plurality of devices;
    a process module creating a plurality of processes independently executing the management command and employing the single software image on each of the plurality of devices from a management console, wherein the management console comprises a process recording field, the process module further creating a management command Dynamic Host Configuration Protocol (DHCP) configuration file for the management command, directing DHCP configuration file accesses to the management command DHCP configuration file, stopping use of an original DHCP configuration file, failing a first process of the plurality of processes on a first device of the plurality of devices in response to the first process writing a status message indicating that the first process is failed to the process recording field, repairing and resuming the first process in response to failing the first process, and determining that each process of the plurality of processes has completed on each of the plurality of devices in response to each process writing a status message indicating that the process is complete to the process recording field;
    a termination module ending the management command after each process has completed; and
    the process module replacing the management command DHCP configuration file with the original DHCP configuration file.

13. The apparatus of claim 12, the setup module further modifying a security configuration of the management console to receive communications from the plurality of devices by setting a port mask to permit writes to a file system of the management console from the plurality of processes.

14. The apparatus of claim 12, the process module further passing a first process for a first device if the first process successfully completes on the first device else failing the first process for the first device.

15. The apparatus of claim 12, wherein the single software image is organized once for the plurality of devices.

16. A computer program product for task context recovery, the computer program product comprising:
   a non-transitory computer readable storage medium having computer readable program code embodied therein, the computer readable program code configured to:
   organize a single software image for a management command, the single software image comprising parameters that specify a logical unit size for each device of a plurality of devices;
   create a plurality of processes independently executing the management command and employing the single software image on each of the plurality of devices from a management console, wherein the management console comprises a process recording field;
   create a management command Dynamic Host Configuration Protocol (DHCP) configuration file for the management command;
   direct DHCP configuration file accesses to the management command DHCP configuration file;
   stop use of an original DHCP configuration file;
   fail a first process of the plurality of processes on a first device of the plurality of devices in response to the first process writing a status message indicating that the first process is failed to the process recording field;
   repair and resume the first process in response to failing the first process;
   determine that each process of the plurality of processes has completed on each of the plurality of devices in response to each process writing a status message indicating that the process is complete to the process recording field;
   end the management command after each process has completed; and
   replace the management command DHCP configuration file with the original DHCP configuration file.

17. The computer program product of claim 16, the computer readable program code modifying a security configuration of the management console to receive communications from the plurality of devices by setting a port mask to permit writes to a file system of the management console from the plurality of processes.

18. The computer program product of claim 16, wherein the management command is selected from the group consisting of a logical partition creation command, a virtual machine creation command, a system migration command, a software installation command, and a software upgrade command.

19. The computer program product of claim 16, wherein the single software image is organized once for the plurality of devices.

20. A method for integrating a computer program product, comprising integrating computer readable program code into a computing system, wherein the code in combination with the computing system performs the following:
   organizing a single software image for a management command, the single software image comprising parameters that specify a logical unit size for each device of a plurality of devices;
   creating a plurality of processes independently executing the management command and employing the single software image on each of the plurality of devices from a management console, wherein the management console comprises a process recording field;
   creating a management command Dynamic Host Configuration Protocol (DHCP) configuration file for the management command;
   directing DHCP configuration file accesses to the management command DHCP configuration file;
   stopping use of an original DHCP configuration file;
   failing a first process of the plurality of processes on a first device of the plurality of devices in response to the first process writing a status message indicating that the first process is failed to the process recording field;
   repairing and resuming the first process in response to failing the first process;
   determining that each process of the plurality of processes has completed on each of the plurality of devices in response to each process writing a status message indicating that the process is complete to the process recording field;
   ending the management command after each process has completed; and
   replacing the management command DHCP configuration file with the original DHCP configuration file.

* * * * *